(12) United States Patent
Platt et al.

(10) Patent No.: US 7,590,240 B2
(45) Date of Patent: Sep. 15, 2009

(54) CONDITIONAL ACCESS SYSTEM AND METHOD PREVENTION OF REPLAY ATTACKS

(75) Inventors: David C. Platt, Mountain View, CA (US); Andrew Goodman, Menlo Park, CA (US); Daniel Zenchelsky, Los Gatos, CA (US)

(73) Assignee: TiVo Inc., Alviso, CA (US)

( * ) Notice: Subject to any disclaimer, the term of this patent is extended or adjusted under 35 U.S.C. 154(b) by 1263 days.

(21) Appl. No.: 10/220,356

(22) PCT Filed: Mar. 2, 2001

(86) PCT No.: PCT/US01/06911

§ 371 (c)(1),
(2), (4) Date: Dec. 11, 2002

(87) PCT Pub. No.: WO01/65762

PCT Pub. Date: Sep. 7, 2001

(65) Prior Publication Data

US 2004/0126093 A1 Jul. 1, 2004

(51) Int. Cl.
*H04N 7/167* (2006.01)
(52) U.S. Cl. ............................................. 380/210
(58) Field of Classification Search ............... None
See application file for complete search history.

(56) References Cited

U.S. PATENT DOCUMENTS

| | | | | |
|---|---|---|---|---|
| 5,796,828 A | * | 8/1998 | Tsukamoto et al. | 380/203 |
| 5,862,299 A | | 1/1999 | Lee et al. | 386/94 |
| 5,937,066 A | * | 8/1999 | Gennaro et al. | 380/286 |
| 5,991,400 A | | 11/1999 | Kamperman | 380/9 |
| 6,105,134 A | * | 8/2000 | Pinder et al. | 713/170 |
| 6,209,097 B1 | * | 3/2001 | Nakayama et al. | 713/193 |

(Continued)

FOREIGN PATENT DOCUMENTS

EP 864 959 9/1998

(Continued)

OTHER PUBLICATIONS

Claims, PCT/US2005/042192, dated Dec. 28, 2006, 12 pages.

(Continued)

*Primary Examiner*—Brandon S Hoffman
(74) *Attorney, Agent, or Firm*—Kirk D. Wong; Hickman Palermo Truong & Becker LLP

(57) ABSTRACT

In a conditional access system, a headend transmits content to one or more receivers in encrypted transport streams. The system provides a multi-layer security architecture, rendering the system resistant to key replay attacks; if one layer is circumvented, subsequent layers remain intact. A first layer prevents unencrypted keys from being recorded by shielding the unencrypted keys from users and encrypting the path from the receiver's conditional access module to the transport decryption module; a second layer prevents a key recorded on one receiver from being played back to the transport decryption module on a second receiver; a third layer prevents a user from decrypting transport streams without the encryption module by encrypting the stream a second time prior to being passed through any user-accessible memory or processor. Events tables are transmitted with the transport stream, either unencrypted for immediate use or encrypted, to prevent unauthorized use.

30 Claims, 1 Drawing Sheet

U.S. PATENT DOCUMENTS

| | | |
|---|---|---|
| 7,239,704 B1 * | 7/2007 | Maillard et al. .............. 380/210 |
| 2003/0118014 A1 | 6/2003 | Iyer et al. |
| 2004/0003079 A1 | 1/2004 | Aiu et al. |
| 2004/0117483 A1 | 6/2004 | Singer et al. |

FOREIGN PATENT DOCUMENTS

| | | |
|---|---|---|
| GB | 2 375 923 A | 11/2002 |
| WO | WO 99/07145 | 2/1999 |
| WO | WO 01/53963 A1 | 7/2001 |
| WO | WO 03/043326 A1 | 5/2003 |
| WO | WO 2005/060659 A2 | 7/2005 |

OTHER PUBLICATIONS

International Preliminary Examining Authority, "Notification of Transmittal of The International Preliminary Report on Patentability", PCT/US2005/042192, dated May 11, 2007, 15 pages.

Iannella, Renato, "Open Digital Rights Language (ODRL)", XP-002333742, IPR Systems, Version 0.9, dated Jun. 29, 2001, 46 pages.

* cited by examiner

CONDITIONAL ACCESS SYSTEM AND METHOD PREVENTION OF REPLAY ATTACKS

BACKGROUND OF THE INVENTION

1. Technical Field

The invention relates to security in conditional access systems. More particularly the invention relates to a conditional access system that includes a multi-layer cryptographic security architecture for prevention of replay attacks.

2. Technical Background

In conditional access systems, such as cable television networks, audio, video, data and other forms of content in electronic form may be broadcast as digital transport streams. The transport stream originates at the system headend and is transmitted to and received by receiver units that display or make use of the transport stream. In order to prevent unauthorized use or viewing of the transport stream, the stream may be encrypted. In such systems, the receiver is capable of decrypting the transport stream prior to viewing or using it.

Typically, the algorithm used to encrypt the transport stream is controlled by an encryption key. When decrypting the transport stream at the receiver end, the receiver must have the key. As a security measure, the key is periodically changed. Because the key is changed on a regular basis, there can be multiple keys required to decrypt the transport stream. The keys are then encrypted and broadcast within the transport stream.

Generally, within the receiver unit of a conditional access system, a transport reception module (TRM) is operative to receive the transport stream transmitted from the headend. Furthermore, a conditional access module (CAM) decides whether or not to decrypt the stream, based on services purchased by the user, If the CAM allows the user to view or otherwise use the transport stream, it decrypts the keys and provides them to the transport decryption module (TDM) for use in decrypting the transport stream. Thus, the TDM is operative to decrypt the transport stream, using the decrypted keys supplied by the CAM. Following decryption, the decrypted stream is displayed to the user on a display module.

Often, encrypted transport streams are recorded by the receiver and stored for future use. Furthermore, current conditional access systems are subject to replay attacks, particularly key replay attacks, in which unencrypted decryption information is intercepted and recorded as it is being passed to a TDM. Subsequently, the recorded decryption information may then be used at a later time to gain unauthorized access to the encrypted transport streams. For example, User A and User B both record a transport stream containing a particular audio/video stream, such as a movie. User A purchases the service; therefore the CAM in A's receiver will provide keys to use in decrypting the transport stream. User A can record the keys provided by the CAM as they are being passed to the TDM, and send them to User B. Thus, User B is able to decrypt the stream using the keys provided by A, viewing or using the stream without purchasing it.

A. Wasilewski, H. Pinder, G. Akins, M. Palgon, *Conditional access system*, U.S. Pat. No. 6,157,719 (Dec. 5, 2000) and R. Banker, G. Akins, *Preventing replay attacks on digital information distributed by network service providers*, U.S. Pat. No. 6,005,938 (Dec. 21, 1999) provide techniques for preventing replay attacks on digital information distributed by network services. At the beginning of a subscription period for a service, a network service provider sends entitlement messages to the subscriber that provide the subscriber with a session key and authorization information, specifying a service and a period of time. When an encrypted service instance is distributed, it is accompanied by entitled control messages. The subscriber equipment that decrypts the service instance does so only if the time specifier in the entitlement control message specifies a time period specified by the authorization information. While the disclosed technique certainly complicates replay attacks by introducing a time element absent in conventional methods, it does not prevent them. In particular, it does not prevent recording and replaying of generated control words or instance keys.

S. Ooi, *Decryptor*, U.S. Pat. No. 5,790,666 (Aug. 4, 1998) describes a decryptor within a receiver unit of a conditional access system that includes a descrambler for descrambling signals scrambled at the headend using a pseudo-random noise generator. At the receiver, a pseudo-random noise generator is induced to change its state, through the provision of a scramble key, so that it generates pseudo-random noise signals that descramble the scrambled signal. The encrypted scramble key is transmitted from the headend and decrypted at the receiver after a cascade of conditions is satisfied. The decryptor, as described, provides a robust, multi-layer security apparatus for a conditional access system. Nevertheless, it suffers a vulnerability to replay attacks common to many conditional access systems. The scramble key, when it has been decrypted, may be intercepted and recorded as it is passed to the descrambler. Subsequently, the recorded key may be replayed, either on the same receiver, or different receivers, creating the possibility of pirating and unauthorized use of the signal.

Accordingly, there exists a need for a way of preventing replay attacks in conditional access systems. It would be desirable to provide protection in multiple layers, so that if one layer is compromised, the other layers remain intact.

SUMMARY OF THE INVENTION

In a conditional access system, a headend transmits content to one or more receivers as encrypted transport streams. The system includes a multi-layer security architecture that renders the system highly resistant to key replay attacks at the receiver. Thus, if one layer is circumvented, the other layers remain intact. A first layer prevents unencrypted keys from being recorded by shielding the unencrypted keys from users and encrypting the path from the receiver's conditional access module (CAM) to the transport decryption module (TDM); a second layer prevents a key recorded on one receiver from being played back to the transport decryption module on a second receiver; and a third layer prevents a user from decrypting transport streams without the encryption module by encrypting the stream a second time prior to being passed through any user-accessible memory or processor.

The multi-layer security architecture is achieved by means of a series of cryptographic procedures between the headend and the various components of the receiver. First is a procedure for pairing the transport components with the CAM in which a random secret generated at the headend is encrypted and transmitted to the transport reception module (TRM), the TDM and the CAM. Each of the three components decrypts the secret and stores it for future use. Second is a transport stream recording procedure that requires a local key, specific to the receiver, generated by the CAM. Third is a procedure for decrypting and replaying the transport stream, also requiring the local key.

An event table for an MPEG stream is constructed in advance of the user purchasing rights to use the stream. In one embodiment, the event table is transmitted unencrypted, along with the corresponding stream, so that the receiver may access the table without decrypting the stream. In an alternative embodiment, the event table is encrypted to prevent unauthorized use.

DETAILED DESCRIPTION

Figure 1:
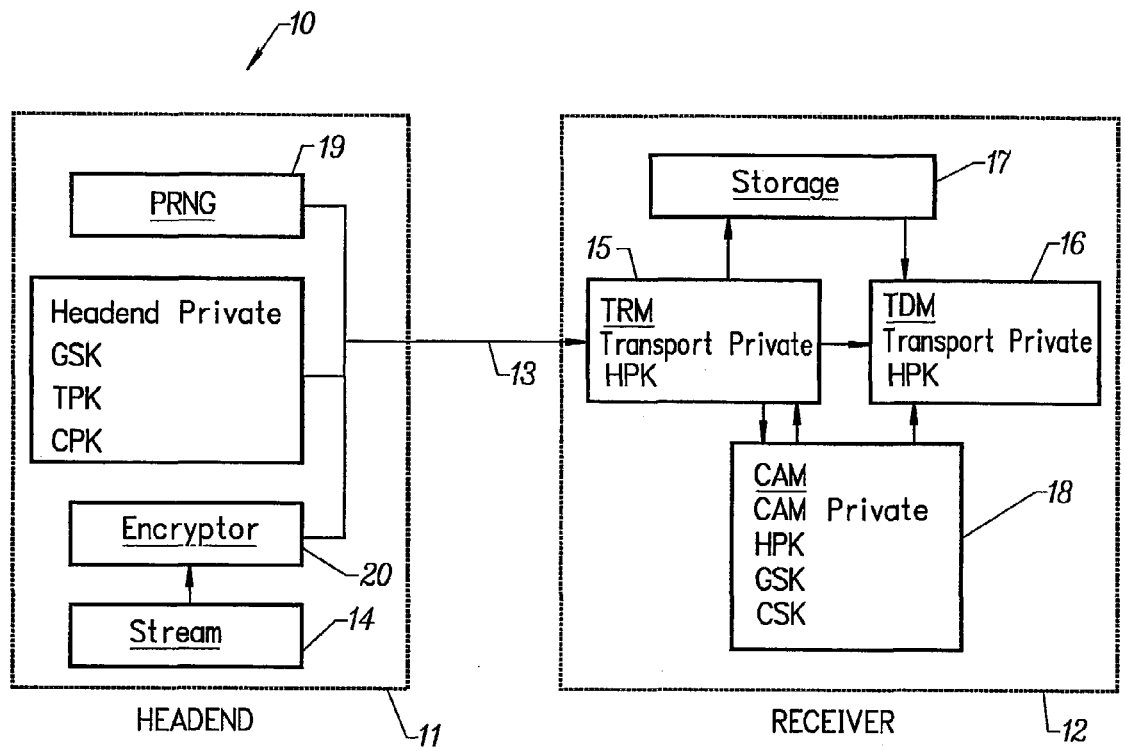
FIG. 1 provides a block diagram of a conditional access system that is resistant to replay attacks, according to the invention.

The invention provides a conditional access system that is resistant to playback attacks. The invention is also embodied as a cryptographic method for rendering a conditional access system resistant to replay attacks, particularly key replay attacks.

Referring now to FIG. 1, shown is a conditional access system that includes a headend 11 and a receiver 12. In actual fact, the system includes a plurality of substantially identical receivers, but the invention is described herein in terms of one receiver. The receiver includes a transport reception module (TRM) 15 for receiving a transport stream 14 from the headend, and saving it to storage component 17. As FIG. 1 shows, the transport stream 14 is encrypted by an encryptor 20 prior to transmission. Further, the receiver includes a transport decryption module (TDM) 16 that retrieves the transport stream from storage components 17 and decrypts it when access rights to the stream have been purchased by an end user. Additionally, the receiver includes a conditional access module (CAM) 18 that is operative to decide whether or not to decrypt the stream, based on the services that the user has purchased. If the CAM allows the user to view or use the transport stream, it decrypts the key required to decrypt the transport stream and provides them to the TDM. The conditional access system 10 incorporates a multi-layer security architecture that prevents key replay attacks at the receiver 12. The novel security architecture relies on conventional encryption technology, applied in a new and unique way. The multi-layer security architecture, based on public key encryption is implemented in a series of cryptographic procedures, described in greater detail below.

By providing multiple layers of security, if one security layer is circumvented, the other layers remain intact, thus providing a much higher degree of protection against replay attacks than is conventionally possible.

A first security layer is provided to prevent keys from being recorded from the CAM 18. This is accomplished by never exposing unencrypted keys to the end user or any user programmable processor within the system, or storing them within any user-accessible memory within the system. Furthermore, the communication path between the CAM and the TDM is encrypted.

If, for some reason, the first layer were to fail, and the user were to gain access to the keys, a second layer prevents the keys from being played back to a TDM on another receiver by ensuring that the TDM will not accept the key without it being transformed in a way that is unique to a particular receiver. Thus, a local key is required that is derived from the decryption key provided by the headend. In an embodiment of the invention, the CAM provides the functionality required to generate local keys. It should be noted that the degree of security provided by this layer is in direct proportion to the degree of difficulty a cracker would encounter in transforming one receiver's key into a key required by a second receiver.

A third layer of security prevents a user from intercepting the transport stream and decrypting it without the TDM. This is accomplished by never exposing the transport stream to the user. Before passing the stream through any user-programmable processor or user-accessible memory, the transport stream must be encrypted a second time. The security of the doubly-encrypted stream is further enhanced by providing an encryption mechanism that produces an encrypted stream that is particular to the receiver, rendering it useless on another receiver.

Implementation

The multi-layer security architecture is implemented as a series of cryptographic procedures, described in detail in Tables 1-3, below.

As shown in FIG. 1,

The headend 11 has:
   a Global Secret Key: GSK;
   a Headend Private Key;
   receiver's Transport Public Key; and
   Receiver's CAM Public Key.

The TRM 15 has:
   Transport Private Key; and
   Headend Public Key.

Likewise, the TDM 16 also has:
   Transport Private Key; and
   Headend Public Key The CAM 18 has:
   CAM Private Key;
   Headend Public Key;
   Global Secret Key; and
   CAM Secret Key.

TABLE 1

CAM to TRM/TDM Pairing Procedure

1. Headend generates random secret: S
2. Headend cryptographically signs S using Headend Private Key: HPK(S).
3. Headend encrypts S, HPK(S) using Transport Public Key: TPK(S, HPK(S)).
4. Headend encrypts S, HPK(S) using CAM Public Key: CPK(S, HPK(S)).
5. Headend transmits (TPK(S, HPK(S)) and CPK(S, HPK(S)) to TRM.
6. TRM decrypts TPK(S, HPK(S)) using Transport Private Key; S, HPK(S).
7. TRM verifies signature of HPK(S) using Headend Public Key. If signature is invalid, processing stops here.
8. TRM stores shared secret, S, for later use.
9. TRM passes TPK(S, HPK(S)) to TDM.
10. TDM decrypts TPK(S, HPK(S)) using Transport Private Key; S, HPK(S).
11. TDM verifies signature of HPK(S) using Headend Public Key. If signature is invalid, processing stops here.
12. TDM store shared secret, S, for future use.
13. TRM passes CPK(S, HPK(S)) to CAM.
14. CAM decrypts CPK(S, HPK(S)) using CAM Private Key: S, HPK(S).
15. CAM verifies signature of HPK(S) using Headend Public Key. If signature is invalid, processing stops here.
16. CAM stores shared secret, S, for future use.

Thus, as described in Table 1, above, a random shared secret S is generated by the headend 11 in step 1. As FIG. 1 shows, the shared secret S is randomly generated at the headend 11 by a pseudo-random number generator 19. However, other equally suitable methods of generating the shared secret S will be apparent to those skilled in the art. The general direction of travel of the signal carrying encryption information is shown by arrow 13. Thus, encrypted decryption keys, encrypted or signed shared secrets, and the encrypted transport stream itself traverse this same path from the headend 11 to the receiver 12. The encrypted keys and shared secrets may be provided at the same time as the transport stream, either embedded in the stream, or as a separate stream, or they may be provided separately from the transport stream. Upon being received from the headend 11, the TRM 15, the TDM 16 and the CAM 18 all received the encrypted shared secret S. They decrypt the shared secret S, verify the signature and store the shared secret S for future use. As described below, the shared secret S is necessary for securely passing the local key, which is required for recording and decrypting the transport stream.

TABLE 2

Transport Stream Recording Procedure

1. Headend generates an encryption Key: K.
2. Headend encrypts key using Global Secret Key: GSK(K).
3. Headend transmits GSK(K) to TRM.
4. Headend encrypts transport stream using K: K(TS).
5. TRM sends GSK(K) to CAM.
6. CAM generates Local Key by encrypting GSK(K) using CAM Secret Key: LK = CSK(GSK(K)).
7. CAM encrypts LK using shared secret, S: S(LK).
8. CAM sends S(LK) to TRM.
9. TRM decrypts S(LK) using shared secret, S: LK.
10. Headend transmits K(TS) to TRM.
11. TRM further encrypts K(TS) using LK: LK(K(TS)).
12. TRM stores GSK(K) and LK(K(TS)) on a storage medium.

As Table 2 describes, the encrypted decryption key GSK(K) is transmitted from the headend in step 3. The CAM transforms the encrypted decryption key GSK(K) into the local key LK by generating LK using the CAM secret key CSK in step 6, and encrypts the generated local key LK using the shared secret S to create S(LK) in step 7 both LK and S(LK) being unique to that particular receiver, rendering the now encrypted decryption key K useless on any other receiver. S(LK) is transmitted to the TRM from the CAM is step 8. Prior to being stored in storage component 17, the encrypted transport stream K(TS) is encrypted a second time in step 11, using the local key LK to create LK(K(TS)), effectively rendering the unencrypted transport stream TS inaccessible. It should be mentioned that storage component may consist of a memory or a mass storage device. The mass storage device may be a fixed drive such as a disk drive, or it may be a removable storage medium, such as a DVD.

TABLE 3

Transport Stream Playback Procedure

1. TDM retrieves GSK(K) and LK(K(TS)) from storage medium.
2. TDM sends GSK(K) to CAM
3. CAM generates Local Key by encrypting GSK(K) using CAM Secret Key: LK = CSK(GSK(K)).
4. CAM decrypts GSK(K) using GSK: K.
5. CAM encrypts K, LK using shared secret, S: S(K, LK).
6. CAM sends S(K, LK) to TDM.
7. TDM decrypts S(K, LK) using shared secret, S: K, LK.
8. TDM decrypts LK(K(TS)) using LK: K(TS).
9. TDM decrypts K(TS) using K: TS.
10. TDM sends Transport Stream, TS, to display module As Table 3 describes, the TDM retrieves the doubly encrypted transport stream LK(K(TS)) from the storage component 17 in step 1, along with GSK(K), i.e. the decryption key K as encrypted by the global secret key. GSK(K) is transmitted to the CAM in step 2, whereupon it is transformed into a local key LK in step 3, using the CAM secret CSK and then encrypted using shared secret S in step 5. Prior to display, the transport stream must be decryption twice. The first decryption is done using the local key LK in step 8, and the second decryption is done using the decrypted decryption key K in step 9, K being previously provided by the headend. Thus, in the form it is retrieved from the storage component, i.e. LK(K(TS)), the transport stream is doubly encrypted and therefore is useless, except on that particular receiver.

The invention is applicable in any type of subscription-based or conditional access network environment, in which a network service provider distributes digital information to users of the network. Typically, the network will be a publicly-accessible telecommunications network such as a cable television network or the Internet. Furthermore, the network connection may be wired or wireless. Depending on the network and the nature of the content provided, the receiver may constitute a set-top box or a personal computer. The nature of the content is highly-variable; the invention is equally applicable to television programming, movies, pay-per-view sports events, digital music, digitized images, information products in digital format or software. Other network environments, hardware platforms and areas of application consistent with the spirit and scope of the invention will be apparent to those skilled in the art.

MPEG is an industry standard for compressing, multiplexing, and transmitting digital video and audio. An MPEG stream is composed of a sequence of data bytes. These bytes can be logically grouped together to form a single element within an MPEG stream. For example, a single element within an MPEG stream might represent a single frame of video within a movie.

The MPEG standard defines byte sequences that indicate the start of an element within an MPEG stream; such byte sequences are commonly referred to as "start codes." Some common examples of MPEG start codes are:

Video Packetized Elementary Stream Header;
Video Group of Pictures Header;
Video I Frame Header;
Video P Frame Header;
Video B Frame Header;
Video Slice Header; and
Audio Packetized Elementary Stream Header.

It is often useful or necessary to build an event table that indicates the location of start codes within an MPEG stream. This table is composed of a list of offsets into the MPEG stream. The offsets listed in the table correspond to locations in the MPEG stream that contain start codes.

The event table may contain additional information, as well. For example, it is often useful to describe what type of start code is located at each offset. Using the event table allows a playback device to quickly locate a particular element within an MPEG stream. For example, one method of quickly scanning through video (fast forward) is to play only a subset of the video frames contained within the stream. The event table can be used to quickly locate those frames that need to be displayed.

One application where it is useful to build such a table is on a device designed to receive, store and play back MPEG stream transmissions. Since MPEG streams are often encrypted before transmission to prevent unauthorized use, it is desirable to store the MPEG stream at the receiver in its encrypted from prior to purchase, in order to prevent unauthorized use. Typically, the stream is not decrypted until the rights to use or view the stream are purchased. Conventionally, the event table cannot be built until the MPEG stream is decrypted. Building the event table can be a time consuming process. Accordingly, this can impose a significant time delay between the time that the rights to use the stream are purchased and the time that the event table is created and available for use.

In order to make the event table available immediately, an embodiment of the invention is provided in which the event table is created prior to transmission of the stream. A first alternative is to transmit the event table along with the associated MPEG stream, so that the receiver has access to the event table without decrypting the MPEG stream. A second alternative is to encrypt the event table itself prior to transmission, to protect it from unauthorized use.

Although the invention has been described herein with reference to certain preferred embodiments, one skilled in the art will readily appreciate that other applications may be substituted without departing from the spirit and scope of the present invention. Accordingly, the invention should only be limited by the claims included below.

What is claimed is:

1. A cryptographic method for rendering a conditional access system resistant to replay attacks comprising the steps of:
   generating a set of one or more keys usable for encryption or decryption, said generating caused by an authorization module controlling authorization of access to a plurality of transport streams, said authorization module on or in communication with a receiver among a plurality of receivers in communication with a headend;
   storing an encrypted transport stream transmitted from said headend, wherein said encrypted transport stream is further encrypted at said receiver, using one or more keys from said set of one or more keys usable for encryption or decryption, so that a doubly encrypted transport stream is stored on a storage medium on or accessible to said receiver; and
   decrypting said doubly encrypted transport stream by a decryption module on or in communication with said receiver using one or more keys from said set of one or more keys usable for encryption or decryption.

2. The method of claim 1, further comprising: adding multiple layers of security such that if one layer is circumvented, subsequent layers remain intact.

3. The method of claim 2, wherein a first layer of said multiple layers of security comprises preventing unauthorized access to said set of one or more keys usable for encryption or decryption by avoiding exposing said set of one or more keys usable for encryption or decryption to user accessible and user programmable resources within said receiver.

4. The method of claim 3, wherein said first layer of said multiple layers of security further comprises encrypting a communication path between said authorization module and said decryption module.

5. The method of claim 2, wherein said receiver is a first receiver, and wherein a second layer of said multiple layers of security comprises preventing said set of one or more keys usable for encryption or decryption from being used by a second decryption module on or in communication with a second receiver by performing said generating of said set of one or more keys usable for encryption or decryption in a manner particular to said first receiver.

6. The method of claim 2, wherein a third layer of said multiple layers of security comprises the step of preventing unauthorized access to an unencrypted version of said encrypted transport stream.

7. The method of claim 6, wherein the step of preventing unauthorized access to an unencrypted version of said encrypted transport stream comprises further encrypting said encrypted transport stream prior to storage.

8. The method of claim 1, wherein said generating step further comprises said authorization module encrypting keys that represent a subset of said set of one or more keys usable for encryption or decryption.

9. The method of claim 1, wherein a corresponding event table is built for said encrypted transport stream prior to transmission of said encrypted transport stream.

10. The method of claim 9, wherein said event table is transmitted along with said encrypted transport stream so that said event table is available for immediate use by said receiver.

11. The method of claim 9, wherein said event table is encrypted prior to transmission of said event table to prevent unauthorized use.

12. The method of claim 1, further comprising:
    creating a random secret at said headend,
    wherein said random secret is usable for encryption or decryption;
    receiving said random secret by a reception module on or in communication with said receiver;
    receiving said random secret by said authorization module; and
    receiving said random secret by said decryption module.

13. The method of claim 1, wherein said step of storing an encrypted transport stream transmitted from said headend further comprises:
    transmitting an encrypted decryption key and said encrypted transport stream from said headend to a reception module on or in communication with said receiver;
    said reception module further encrypting said encrypted transport stream to create said doubly encrypted transport stream; and
    said reception module storing said encrypted decryption key and said doubly encrypted transport stream in said storage medium.

14. The method of claim 1, wherein said step of decrypting said doubly encrypted transport stream further comprises:
    said decryption module retrieving said doubly encrypted transport stream and an encrypted decryption key from said storage medium;
    said decryption module decrypting said doubly encrypted transport stream to obtain said encrypted transport stream; and
    said decryption module decrypting said encrypted transport stream.

15. The method of claim 1, wherein said decryption module is uniquely capable of decrypting said doubly encrypted transport stream.

16. The method of claim 1, wherein said doubly encrypted transport stream is encrypted at least once more before being stored on said storage medium.

17. A conditional access system resistant to replay attacks, comprising:
    a generated set of one or more keys usable for encryption or decryption,
    said generation caused by an authorization module controlling authorization of access to a plurality of transport streams,
    said authorization module on or in communication with a receiver among a plurality of receivers in communication with a headend,
    said receiver capable of further encrypting an encrypted transport stream transmitted from said headend using one or more keys from said generated set of one or more keys usable for encryption or decryption, so that a doubly encrypted transport stream is stored on a storage medium on or accessible to said receiver; and a decryption module on or in communication with said receiver for decrypting said doubly encrypted transport stream.

18. The system of claim 17, the system further including: a first layer among one or more layers of security, said first layer preventing unauthorized access to said generated set of one or more keys usable for encryption or decryption by avoiding exposing said set of one or more keys usable for encryption or decryption to user accessible and user programmable resources within said receiver.

19. The system of claim 18, wherein said first layer further comprises a module for encrypting a communication path between said authorization module and said decryption module.

20. The system of claim 17, wherein said receiver is a first receiver, the system further including: a second layer among one or more layers of security, said second layer preventing said generated set of one or more keys usable for encryption or decryption from being used by a second decryption module on or in communication with a second receiver by generating said generated set of one or more keys usable for encryption or decryption in a manner particular to said first receiver.

21. The system of claim 20, wherein said second layer further comprises said authorization module encrypting keys that represent a subset of said generated set of one or more keys usable for encryption or decryption.

22. The system of claim 17, the system further comprising: a third layer among one or more layers of security, said third layer preventing unauthorized access to an unencrypted version of said encrypted transport stream.

23. The system of claim 22, wherein said third layer further comprises further encrypting said encrypted transport stream prior to storage.

24. The system of claim 17, further comprising a corresponding event table for said encrypted transport stream, wherein said event table is built prior to transmission of said encrypted transport stream.

25. The system of claim 24, wherein said event table is transmitted along with said encrypted transport stream.

26. The system of claim 24, wherein said event table is encrypted prior to transmission of said encrypted transport stream.

27. The system of claim 17, further comprising:

a reception module on or in communication with said receiver having access to a random secret;

said authorization module having access to said random secret;

said decryption module having access to said random secret;

wherein said random secret is usable for encryption or decryption; and wherein said random secret is transmitted from said headend.

28. The system of claim 17, further comprising:

said storage medium on or accessible to said receiver storing said doubly encrypted transport stream and an encrypted decryption key, wherein said doubly encrypted transport stream and said encrypted decryption key are stored by at least the following steps:

transmitting said encrypted decryption key and said encrypted transport stream from said headend to a reception module on or in communication with said receiver;

said reception module further encrypting said encrypted transport stream to create said doubly encrypted transport stream; and said reception module storing said encrypted decryption key and said doubly encrypted transport stream in said storage medium.

29. The system of claim 17, further comprising:

an unencrypted version of said doubly encrypted transport stream, wherein said doubly encrypted transport stream is unencrypted using at least the following steps:

said decryption module retrieving said doubly encrypted transport stream and an encrypted decryption key from said storage medium;

said decryption module decrypting said doubly encrypted transport stream to obtain said encrypted transport stream; and said decryption module decrypting said encrypted transport stream.

30. The system of claim 17, wherein said decryption module is uniquely capable of decrypting said doubly encrypted transport stream.

* * * * *